(12) United States Patent
Schwerin

(10) Patent No.: US 6,691,187 B1
(45) Date of Patent: Feb. 10, 2004

(54) PRINTER-BASED INTERFACE WITH REMOVABLE DIGITAL STORAGE MEDIA

(75) Inventor: James A. Schwerin, Costa Mesa, CA (US)

(73) Assignee: Canon U.S.A., Inc., Lake Success, NY (US)

(*) Notice: Subject to any disclaimer, the term of this patent is extended or adjusted under 35 U.S.C. 154(b) by 267 days.

(21) Appl. No.: 09/895,186

(22) Filed: Jul. 2, 2001

(51) Int. Cl.⁷ .......................... G06F 13/10; G06F 13/12
(52) U.S. Cl. .................. 710/62; 710/8; 710/14; 710/15; 710/18; 710/72; 710/73
(58) Field of Search .................. 710/8, 14, 15, 710/18, 62, 72, 73

(56) References Cited

U.S. PATENT DOCUMENTS

| | | | |
|---|---|---|---|
| 4,677,661 A | 6/1987 | Gilluwe et al. ............. 379/159 |
| 5,068,889 A | 11/1991 | Yamashita ................... 379/62 |
| 5,537,626 A | * 7/1996 | Kraslavsky et al. ........... 710/8 |
| 5,717,957 A | * 2/1998 | Lin .............................. 710/72 |
| 6,256,059 B1 | 7/2001 | Fichtner ..................... 348/207 |
| 6,360,362 B1 | 3/2002 | Fichtner et al. ............... 717/11 |

FOREIGN PATENT DOCUMENTS

JP        2001-117783        4/2001

* cited by examiner

Primary Examiner—Rehana Perveen
(74) Attorney, Agent, or Firm—Fitzpatrick, Cella, Harper & Scinto

(57) ABSTRACT

An access device to a removable digital storage medium which is connectable to a printing device and a computing device with multiple software modules. The access device includes an interface to the removable digital storage medium, a bi-directional interface to the computing device and a bi-directional interface to the printing device. The access device also includes one or more buttons, wherein software in the computing device is configured to detect button depression and to launch one or more software modules in correspondence to the depressed button.

48 Claims, 7 Drawing Sheets

PRINTER-BASED INTERFACE WITH REMOVABLE DIGITAL STORAGE MEDIA

BACKGROUND OF THE INVENTION

1. Field of the Invention

The invention concerns a media reader for accessing data stored on removable digital storage media, such as compact flash media for digital cameras. In particular, the invention concerns a media reader which also includes a hub with ports for connecting to other computing devices and peripherals, and programmable buttons for initiating operations on a connected computing device.

2. Description of the Related Art

The popularity of digital photography is constantly increasing. Continuous improvements in digital imaging technologies have blurred the line separating digital photography from traditional photography. Improvements in editing and processing capabilities available with digital photography continually open doors to new forms of creative expression available to both the amateur and the professional. At the same time, advancements in printing technologies have enabled printers to vividly reproduce a wide range of colors at resolutions that rival traditional photographic prints.

As the costs decrease for digital photography and photo-quality printing, and as the functionality and ease of use increase, digital photography appeals to a wider range of individuals. Simple-to-use cameras and carefully engineered software enable even beginners to take advantage of the benefits associated with digital photography. However, a trade-off often occurs between simplifying use and providing an increasing number of capabilities. For example, products such as media readers and printers have been developed to automatically perform a pre-selected processing function or launch a pre-selected application when connected to storage media containing image data. Japan 2001-117783 provides one example where a pre-selected application is launched when storage media containing data is inserted into a media reader. While these types of products may provide convenient access to stored image data, they typically do not allow the user to control what application is automatically launched or which processing functions are automatically performed, thereby limiting the user to those settings determined by the product's maker.

Additionally, even simple-to-use digital photography systems may intimidate a novice user when the equipment is initially installed and configured. Generally, digital photography systems require a personal computer for uploading and processing digital images from the digital camera, a color printer for printing the processed digital images, and a media reader for accessing the digital images stored on the removable digital storage media utilized by the digital camera. Due to the limited number of ports available on many personal computers, the user may also required to use a hub allowing several peripheral devices to be connected to the personal computer. The user must connect all of the equipment together and configure the equipment to work together to perform the desired functionality. Not only does setting up the equipment present possible connection and configuration problems, the ever-increasing amount of required equipment takes up what might be limited space on a user's desk or workspace.

Another downside to many digital photography systems is that the user is required to access and operate a personal computer connected to the media reader in order to process and edit the digital images stored on removable digital storage media. Accordingly, convenient processing and printing of digital image data requires the user to be near the media reader, the printer and the personal computer configured with editing software. While this requirement may not be an issue with typical home users, in a network environment that requires users to share both printers and media readers, requiring a user to be near a personal computer as well as a media reader and printer at the same time can be difficult for the user.

SUMMARY OF THE INVENTION

The present invention addresses the foregoing concerns by providing a robust solution for allowing a user to access image data stored on a removable digital storage medium and to execute various functions and processing of the image data. Specifically, the invention provides an access device for accessing image data stored on removable digital storage media which includes a bi-directional interface with a computing device and one or more buttons configurable to initiate software modules within the computing device when depressed.

According to one aspect of the invention, the invention concerns an access device to a removable digital storage medium, the device being connectable to a printing device and a computing device with multiple software modules. The access device comprises an interface to the removable digital storage medium, a bi-directional interface to the computing device, a bi-directional interface to the printing device and one or more buttons. Software in the computing device is configured so that in response to the computing device detecting button depression, the computing device launches one or more of the multiple software modules of printing functionality.

By virtue of the foregoing, a user is provided with a robust solution for accessing image data stored on removable digital storage media, and for processing the image data, ordinarily without having to directly use a personal computer attached to the access device. That is, because the personal computer processes the image data automatically, there is no need for a user to do it unless the user wants to. Accordingly, and particularly when the access device is physically formed into part of the printer itself, the user can perform digital image processing and printing of the stored images without leaving the printer and without the user being required to directly interface with the personal computer.

This brief summary has been provided so that the nature of the invention may be understood quickly. A more complete understanding of the invention can be obtained by reference to the following detailed description of the preferred embodiment in connection with the attached drawings.

DETAILED DESCRIPTION OF THE PREFERRED EMBODIMENTS

Figure 1:
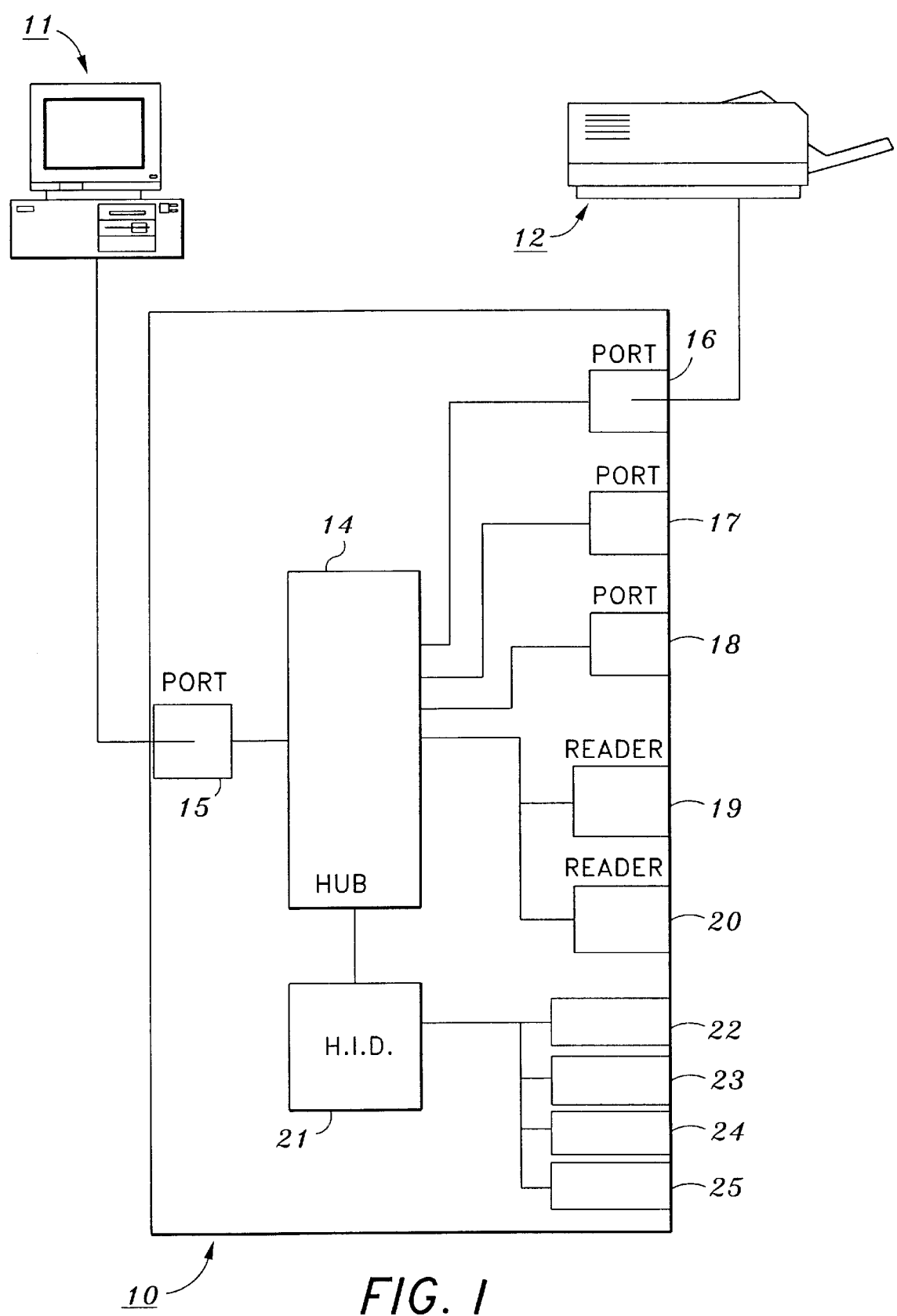
FIG. 1 is a block diagram depicting one implementation of the structure of the present invention.

FIG. 1 is a block diagram depicting one implementation of the structure of the present invention. As can be seen in FIG. 1, access device 10 contains a hub and several devices and ports connected to that hub. Hub 14 is a Universal Serial Bus (USB) hub, which facilitates the connection to a Universal Serial Bus of multiple USB compatible devices, thereby providing for bidirectional communication and cooperation between the connected devices. Port 15 is an upstream USB port that accepts connections to upstream USB compatible devices such as personal computers. Ports 16 to 18 are downstream USB ports that accept connections to downstream USB compatible devices such as digital cameras, printers and other peripheral devices. The use of the ports together with other devices and/or hubs provides the means to connect a large number of hub-based devices. While this embodiment is described as using USB architecture to provide interconnection between devices, it is to be understood that other types of bus architectures may be employed in practicing this invention. For example, in place of USB, Ethernet or IEEE 1394 bus architecture can be used to provide interconnection between the devices.

As shown in FIG. 1, access device 10 is connected to a computing device, personal computer (PC) 11, via port 15. PC 11 contains applications which are executed in the implementation of the present invention. The operation of PC 11 will be described in more detail below. The computing device connected to access device 10 is not limited to a personal computer. For example, any computing device that is compatible with the bus architecture being used, in this case USB, and contains the necessary applications may be used. A printing device, printer 12, is connected with access device 10 via port 16. Printer 12 is also not limited to any particular type of printer. For example, in the configuration where printer 12 is connected to port 16, any type of printer that is compatible with a USB connection can be used. Alternatively, printer 12 may be connected directly to PC 11 by means of a parallel port or some other bi-directional interface. For purposes of this description, printer 12 is a USB compatible printer connected via port 16.

Ports 17 and 18 provide additional downstream USB connections to hub 14. This embodiment provides these two expansion USB ports for attaching additional downstream USB devices to the system. However, it is to be understood that the invention may include more or less than two additional expansion USB ports. By providing additional expansion USB ports beyond the number required to connect to the computing device and the printing device, the present invention allows a user to expand the connectability of a particular system by increasing the capacity of the number of devices that can be added.

In addition to ports 15 to 18, access device 10 also includes multiple devices connected to hub 14. The multiple devices within access device 10 include media reader 19 and card reader 20. Both media reader 19 and card reader 20 are USB devices that provide an interface for connecting removable digital storage media to access data stored on the media. When removable digital storage media are connected to one of these devices, the data stored on the media is accessible to another USB device that is connected to hub 14. For example, an application running on PC 11 could upload image data stored on the media connected to either media reader 19 or card reader 20.

In this embodiment, media reader 19 is a card reader that provides a connection and access to compact flash storage media. Card reader 20 is a card reader that provides a connection and access to removable digital storage media in the form of PC cards with a PCMCIA interface. Accordingly, access device 10 can be used to read stored image data from either compact flash storage media or PC cards. However, the invention is not limited to these two types removable digital storage media. The connected USB devices may be readers for other types of removable digital storage media besides compact flash storage media. For example, media reader 19 could provide access to data stored on Smart Media, Sony's Memory Stick, IBM Microdrive, etc. For purposes of this description, media reader 19 will be considered as being compatible with compact flash storage media.

Also connected to hub 14 within access device 10 is Human Interface Device (HID) 21. HID 21 in turn is connected to buttons 22 to 25, which are also part of access device 10. HID 21 is a USB device for monitoring whether buttons 22 to 25 have been depressed by a user or not. When one or more of buttons 22 to 25 have been depressed by a user, HID 21 notifies PC 11 via hub 14 which button has been depressed. PC 11 then executes an action associated with the particular button that was depressed. A more detailed explanation of the operation of buttons 22 to 25 and the initiation of the associated actions within PC 11 will be provided below. While access device 10 is shown in FIG. 1 to have 4 buttons, it is to be understood that the number of buttons used in implementing the invention may vary.

Figure 2:
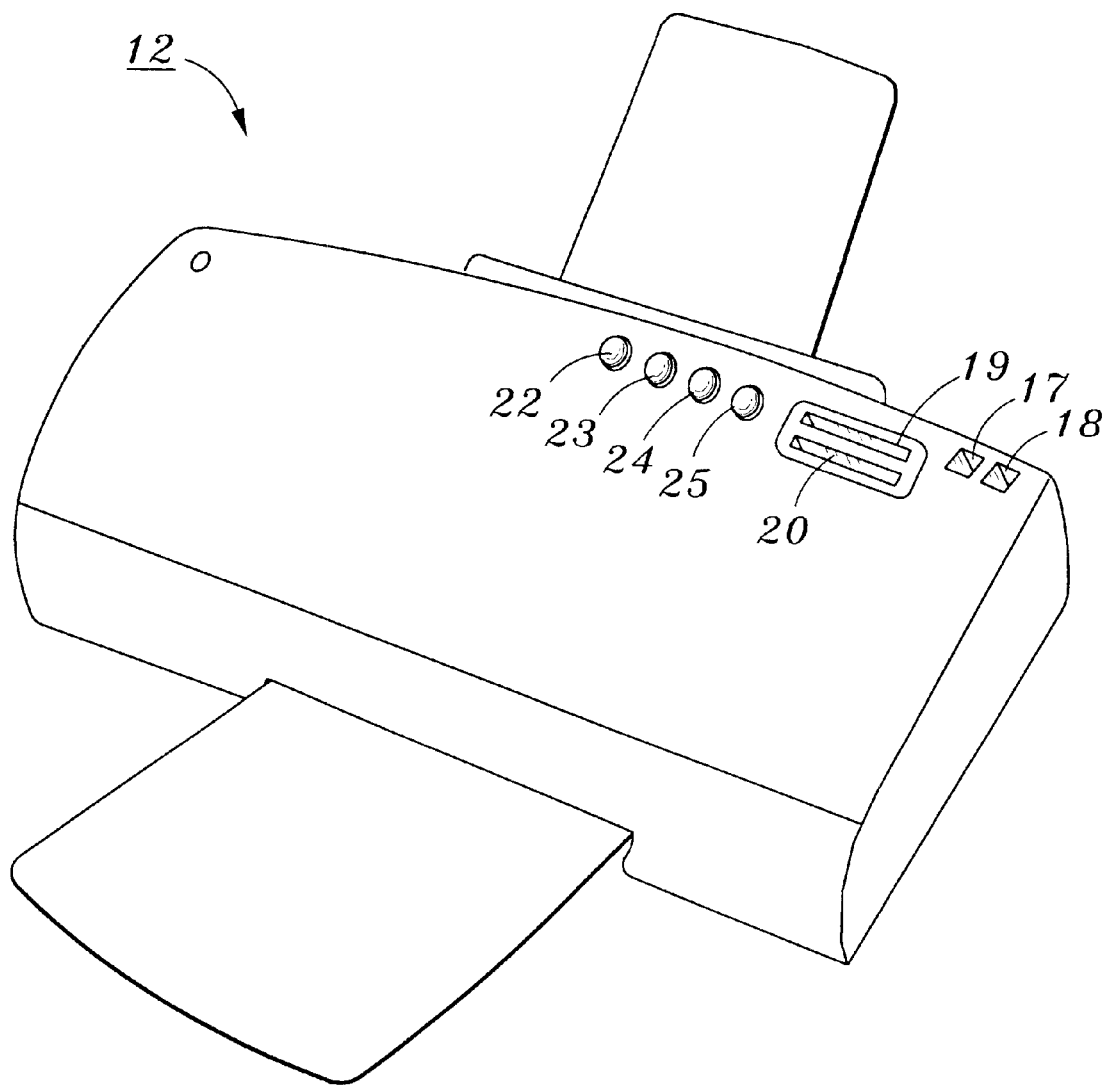
FIG. 2 is a depiction of one embodiment of the present invention.

FIG. 1 depicts access device 10 as being physically separate from both PC 11 and printer 12. The relative organization shown in FIG. 1 is for descriptive purposes and does not depict the preferred arrangement. In the preferred embodiment, access device 10 is incorporated within printer 12, as depicted in FIG. 2. FIG. 2 depicts printer 12 as being configured with media reader 19, card reader 20, ports 17 and 18, and buttons 22 to 25. Port 16, for connecting access device 10 with printer 12 is internal to printer 12 and is not shown in FIG. 2. Additionally, port 15, for connecting access device 10 with PC 11, is typically located on the back of printer 12 and is also not shown in FIG. 2. Printer 12 is depicted in FIG. 2 as an ink-jet printer. However, as discussed above, the present invention is not dependent on the type of printing device used, as long as the printing device is compatible with USB. For example, printer 12 could also be a laser printer. Since the details of the actual printing operation used by the specific type of printer are not necessary to understand the present invention, they are not provided.

Figure 3:
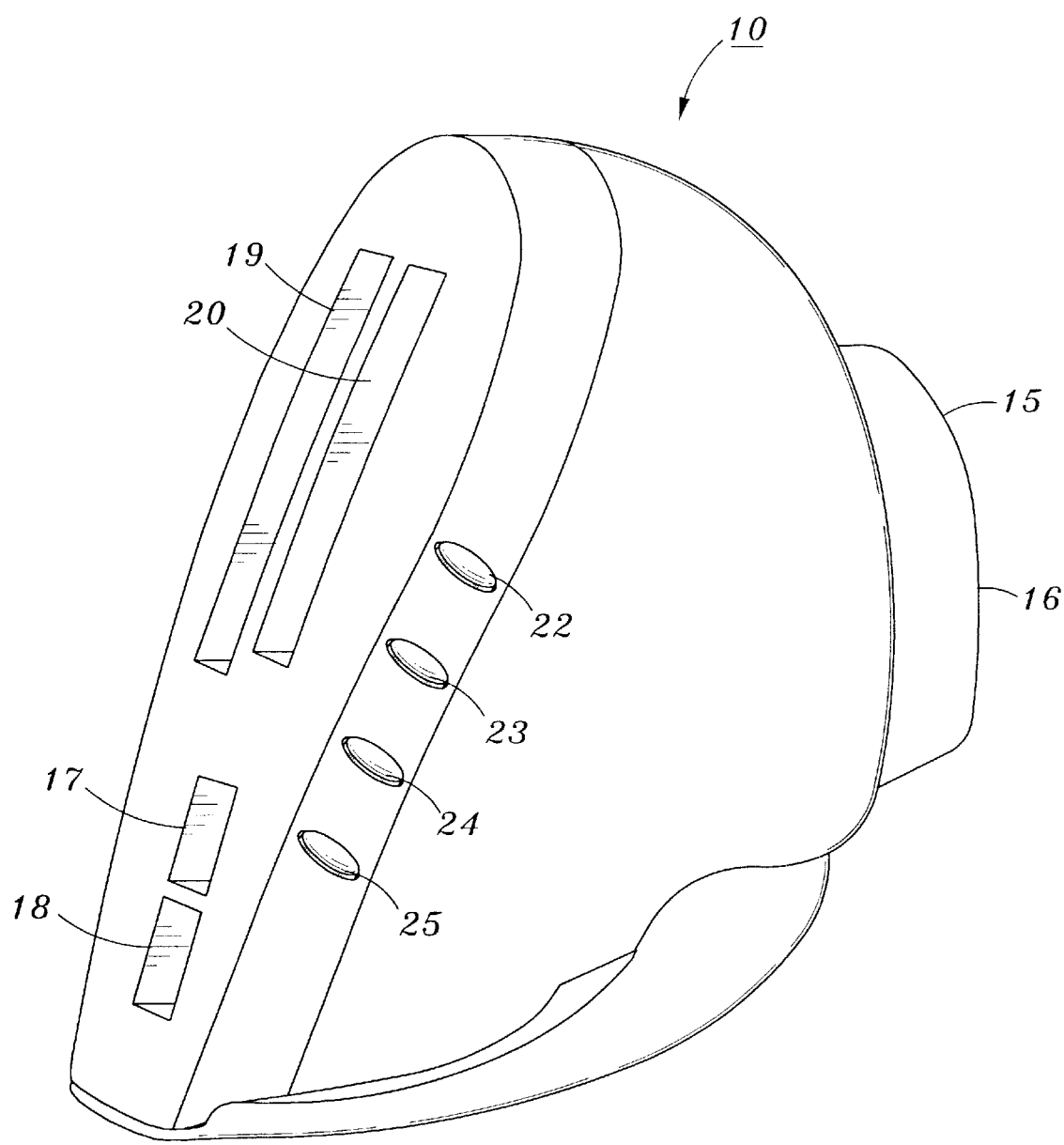
FIG. 3 is a depiction of an alternative embodiment of the present invention.

FIG. 3 represents an alternative embodiment of the present invention. FIG. 3 depicts access device 10 as a stand-alone device, physically separate from a printer device, for connecting with a computing device. A printing device or printer system may be connected either directly to the computing device via a bidirectional interface, or to access device 10 via a USB port. This embodiment is preferable in the event a user desires to add the functionality of the present invention to an existing printing system. As shown in FIG. 3, access device 10 includes media reader 19, card reader 20, buttons 22 to 25, and ports 17 and 18. Ports 15 and 16, for connecting with PC 11 and, if necessary, printer 12 respectively, are typically located on the back of access device 10, and are therefore not shown in the figure.

Figure 4:
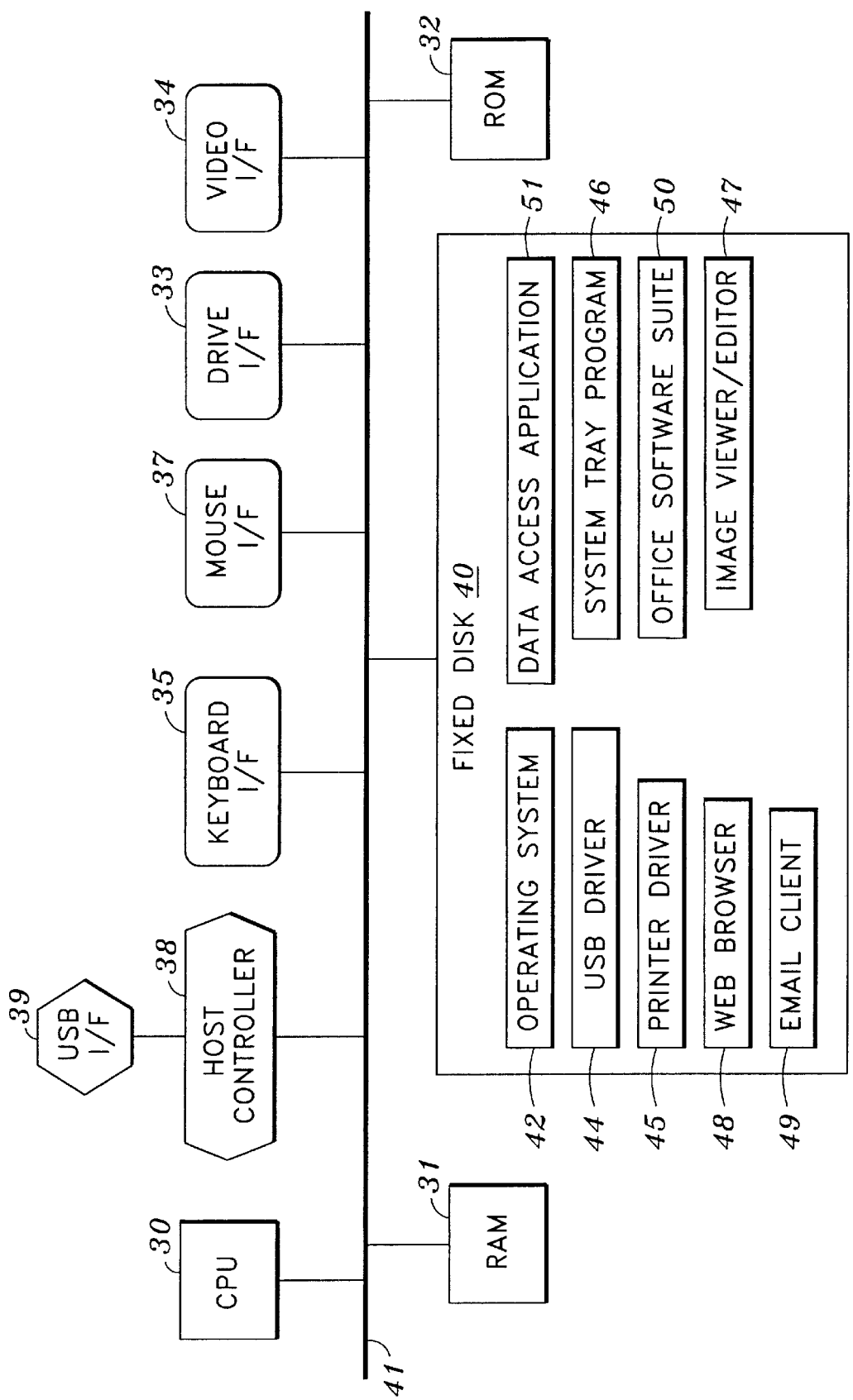
FIG. 4 is a block diagram depicting the internal architecture of a personal computer used in implementing the present invention.

FIG. 4 is a block diagram depicting the internal architecture of PC 11. As seen in FIG. 4, PC 11 includes CPU 30, RAM 31, ROM 32, fixed disk 40 and bus 41. CPU 30 is a microprocessor for executing program instruction sequences. RAM 31 provides memory space for CPU 30 to fetch and execute program instructions stored on fixed disk 40, or on other types of storage media such as CD-ROM or floppy disk. ROM 32 stores invariant instruction sequences, such as startup instruction sequences for CPU 30 or BIOS sequences for the operation of peripheral devices attached to PC 11 (not shown). Communication between the components of PC 11 is performed via bus 41.

As can be seen in FIG. 4, PC 11 also includes multiple interfaces for connecting and communicating with various devices. Drive interface 33 connects drives, such as a floppy disk drive (not shown) or a CD-ROM drive (not shown), to bus 41 of PC 11. Video interface 34 connects a display device (not shown), such as a monitor or flat-panel display, to PC 11, in order to provide means for applications being executed on PC 11 to display data or user interface displays. Keyboard interface 35 and mouse interface 37 provide connections for a keyboard (not shown) and a mouse (not shown), thereby allowing a user to input data and select items displayed on a monitor using the keyboard or mouse.

USB interface 39 allows PC 11 to connect to hub 14 of access device 10. Accordingly, PC 11 can communicate with the USB devices connected to hub 14. Host controller 38 manages and controls the USB devices connected to PC 11 via USB interface 39. USB devices include media reader 19, card reader 20 and HID 21. In addition, USB peripheral devices such as a keyboard or mouse may be connected to PC 11 via USB interface 39 instead of using keyboard interface 35 and mouse interface 37.

Fixed disk 40 is one example of a computer-readable medium for storing program instructions to be executed by CPU 30. Fixed disk 40 contains operating system 42, USB driver 44, printer driver 45, system tray program 46, image viewer/editor 47, web browser 48, email client 49, office software suite 50 and data access application 51. Operating system (OS) 42 can be a windowing operating system, such as Windows 2000, or a Unix based operating system that supports USB. Operating system 42 manages the applications running on PC 11 as well as the various components that make up PC 11. USB driver 44 facilitates communication between applications running on PC 11 and USB devices connected via USB interface 39. Printer driver 45 facilitates preparing and sending print jobs to a printing device, such as printer 12.

Application programs 47 to 51 are provided for pre-selection of one or more of them for launch and execution upon the occurrence of a designated event. Designated triggering events include insertion and connection of removable digital storage media to access device 10 and the depression of one or more of buttons 22 to 25. In this embodiment, image viewer/editor 47 is an application for viewing and editing digital images. Web browser 48 is an application, such as Microsoft's Internet Explorer or Netscape's Navigator, that allows a user to view material such as web pages over the Internet. Email client 49 is an application for sending and receiving email over the Internet or a local network. Office Suite 50 is a group of applications including word processors, spreadsheets, and presentation applications. Data access application 51 accesses data stored at one location, image data on storage media connected to access device 10 for example, and transfers or copies that data to a different location, a specified folder on PC 11 for example.

System tray program 46 is an application controlling the programmable features of the present invention. System tray program 46 monitors for the connection of removable digital storage media to access device 10, and launches and executes one or more applications pre-selected by a user when new digital storage media has been connected. For example, system tray program 46 can be configured to launch and execute data access application 51 when removable digital storage media has been connected, where data access application 51 executes to copy the image data stored on the connected storage media to a pre-selected folder on PC 11. The present invention is not limited to launching data access application 51 when removable digital storage media is connected to access device 10. A user can configure system tray program 46 to launch one or more of the other applications available when storage media is connected.

System tray program 46 also monitors for a signal from HID 21 that one or more of buttons 22 to 25 have been depressed. When a button has been depressed, system tray program 46 launches and executes one or more pre-selected applications. As mentioned above, a user can configure system tray program 46 to launch and execute one or more applications that have been selected by a user. Possible applications include launching and executing data access application 51 to transfer image data stored on the removable storage media to PC 11, and launching image viewer/editor 47 to allow the user to view and modify the transferred image data.

Finally, system tray program 46 provides an interface for a user to configure the invention by pre-selecting the desired applications to be launched and executed when either of the two events discussed above occur. A more detailed explanation of the operations of system tray program 46 and its interaction with access device 10 will be provided below.

Figure 5:
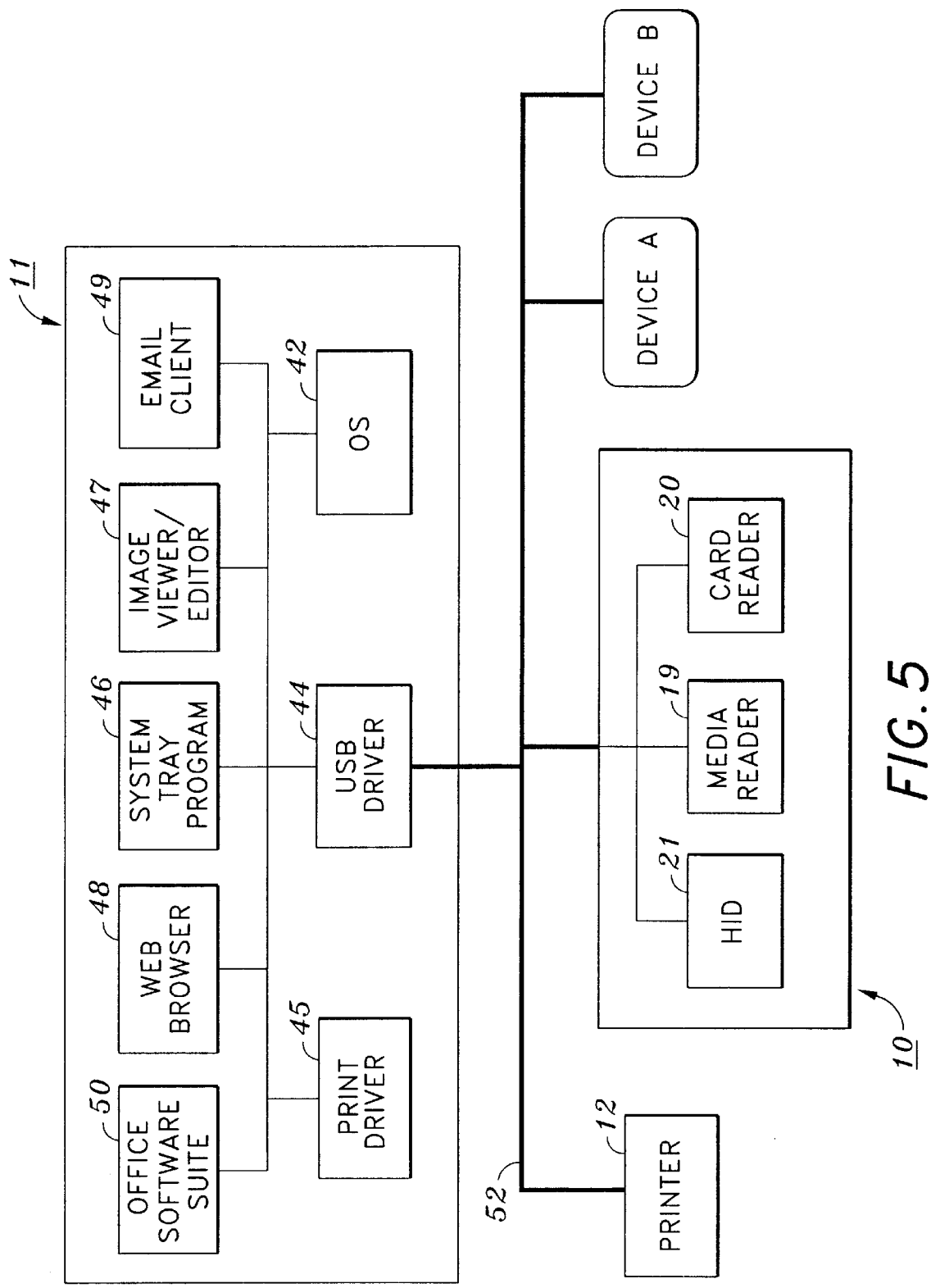
FIG. 5 is a block diagram illustrating the functionality of the present invention.

FIG. 5 is a block diagram for explaining the functionality of access device 10, PC 11 and printer 12 within a USB environment. All USB devices are connected together on USB 52. Device A and Device B are shown in FIG. 5 merely to represent the possibility of connecting additional USB devices, such as digital cameras or external disk drives, to USB 52 through ports 17 and 18 of access device 10. As mentioned above, communication between USB devices connected via USB interface 39 and applications on PC 11 is conducted through USB driver 44.

As discussed earlier, system tray program 46 monitors for the connection of removable digital storage media to access device 10. When removable digital storage media, such as a compact flash media card, is connected to access device 10, media reader 19 or card reader 20 notifies OS 42 through USB driver 44 that digital storage media has been connected. OS 42 then designates a new drive within PC 11 corresponding to the newly connected digital storage media. System tray program 46 monitors the actions of OS 42 to detect the event of OS 42 designating a new drive corresponding to newly connected digital storage media. When a new drive designation is detected by system tray program 46, one or more pre-selected applications are launched and executed on PC 11.

A wide variety of actions can be performed by the applications launched and executed by system tray program 46 in response detecting the connection of new removable digital storage media. For example, when new storage media is connected to access device 10, system tray program 46 could be configured to upload the image data from the storage media with data access application 51, launch image viewer/editor 47 and display the stored images within image viewer/editor 47. Alternatively, system tray program 46 could be configured to upload the image data and store it in a specified directory within fixed disk 40 in PC 11 using data access application 51. Other possible actions that could be executed by launched applications include, but are not limited to, uploading the image data to PC 11 and printing an index sheet of all the stored images on printer 12, uploading the stored image data to an archive Internet site, or printing formatted template sheets of the stored images on the storage media. The applications to be launched and executed are pre-selected either by the system manufacturer or by a user beforehand. The interface for configuring the applications by a user within system tray program 46 will be described in more detail below.

As discussed earlier, system tray program 46 also monitors for the depression of buttons 22 to 25 on access device 10. When one or more of buttons 22 to 25 are depressed by a user, HID 21 notifies system tray program 46 of the button depression via USB driver 44. In response, system tray program 46 launches and executes an application corresponding to the particular button that was depressed. Like the applications assigned to the event of digital storage media being connected to access device 10, a user can also configure system tray program 46 to launch and execute specific applications upon detecting button depression. The possible actions to be executed by launched applications include those mentioned above in relation to the connection of storage media. In addition, pressing one of the buttons might initiate system tray program 46 to launch web browser 48, download a particular web page, and print the contents of the web page on printer 12. It is to be understood that the present invention is not limited to the above examples of functions executed by launched applications. Other applications, and functions to be executed by those applications, may be pre-selected by a user within system tray program 46.

Figure 6:
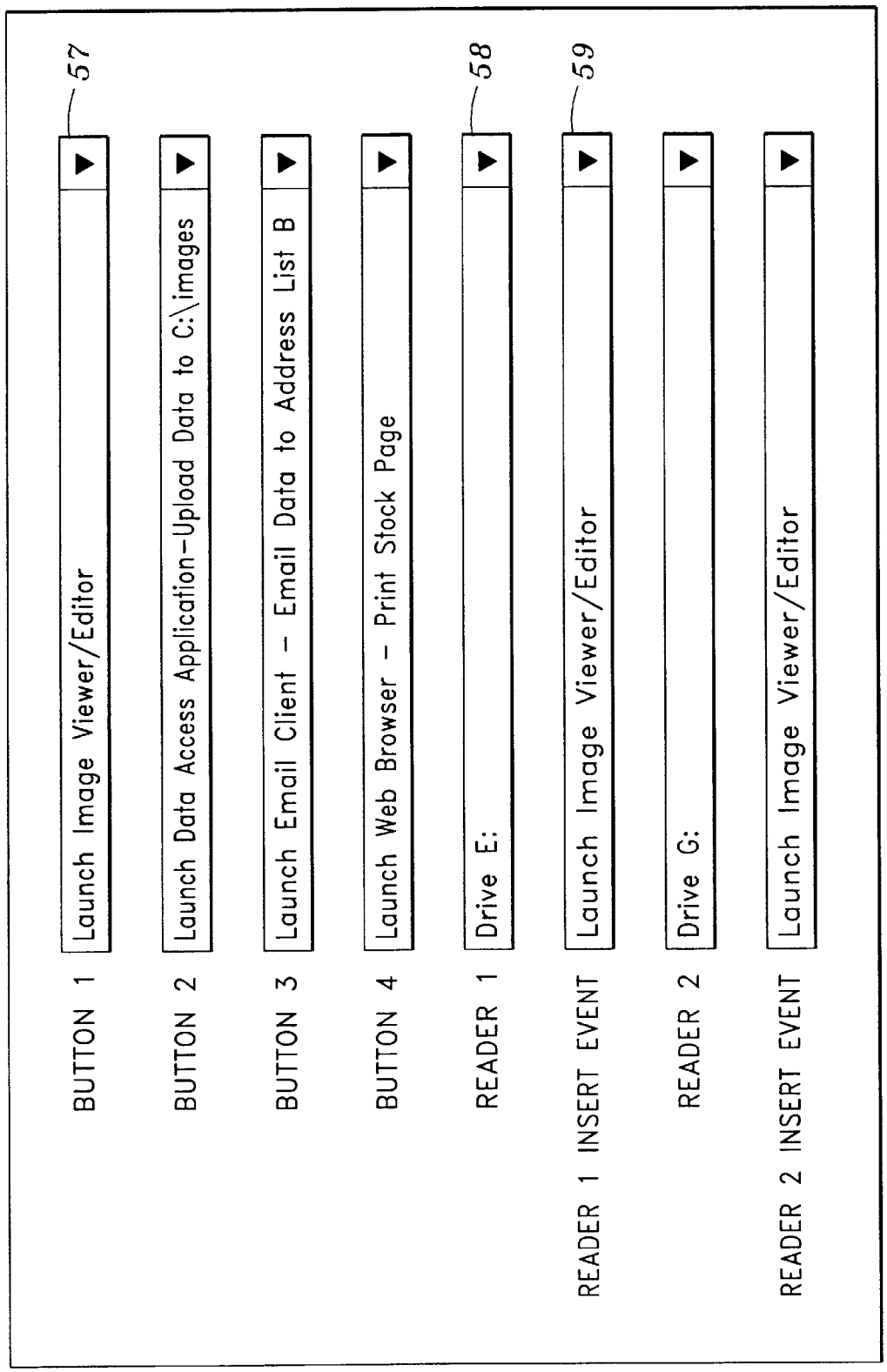
FIG. 6 is a depiction of a user interface for configuring the present invention.

FIG. 6 is a depiction of user interface 55 for system tray program 46, with which applications, and functions executed by applications, to be launched by system tray program 46 can be configured. Initially, system tray program 46 may be configured with default applications and functions specified for each of the buttons and for the applications to be launched and executed when removable digital storage media is connected to access device 10. Alternatively, a user may be required to select the desired applications to be launched and executed during the initial use of the invention. In either event, system tray program 46 provides user interface 55, which provides an simple method for a user to configure the present invention.

User interface 55 consists of a pull-down menu 57 for each of buttons 22 to 25. A user can select from the list of applications, and functions to be performed by those applications, contained within pull-down menu 57, and designate an application to be launched and executed when the button associated with the particular pull-down menu 57 is depressed on access device 10. In this manner, a user can configure buttons 22 to 25 on access device 10 to cause a particular application to be launched and/or specific functions to be executed by the particular application when depressed, thereby allowing the user to process the contents of removable digital storage media connected with access device 10 without the user having to interface directly with PC 11.

User interface 55 also provides pull-down menus 58 and 59 associated with media reader 19. In a manner similar to that described above with respect to buttons 22 to 25, a user can select from a list of options within the pull-down menus corresponding to media reader 19. Pull-down menu 58 allows the user to designate what drive letter will be used by OS 42 when designating a new drive for newly connected storage media. Pull-down menu 59 allows the user to select an action to be performed when storage media is connected to media reader 19. The possible actions listed in pull-down menu 59 may include, but are not limited to those listed in pull-down menu 57 for assigning an action to be performed to a specific button on access device 10.

User interface 55 provides the same pull-down menus for card reader 20 as are provided for media reader 19. Accordingly, a user can configure card reader 20 in the same manner as media reader 19 was configured. Additionally, in this embodiment a user can configure the drive letter to be assigned to newly connected digital storage media.

Figure 7:
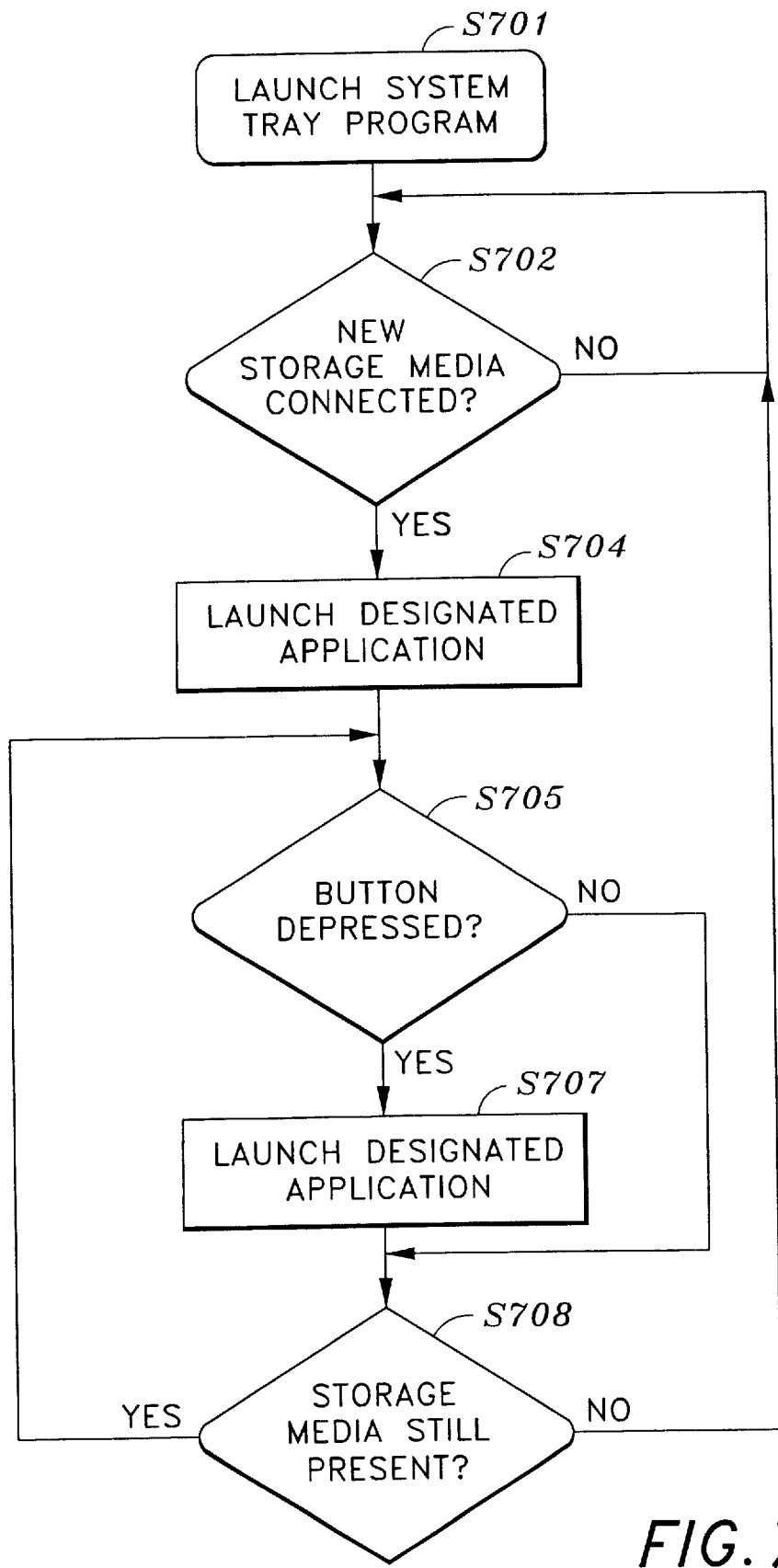
FIG. 7 is a flowchart depicting the operation of the present invention.

FIG. 7 is a flowchart depicting the operating process of system tray program 46. In step S701, system tray program 46 is launched on PC 11. System tray program 46 may be launched when PC 11 is started up, by a user command entered after PC 11 has begun operating, or in response to the connection of access device 10 to the Universal Serial Bus. After system tray program 46 has been launched, it begins monitoring for the connection of removable digital storage media to access device 10 in step S702. As discussed earlier, system tray program 46 monitors for the designation by OS 42 of a drive corresponding to connected digital storage media.

If no new storage media has been connected, the process remains at step S702. If new storage media has been connected and a drive designated by OS 42, system tray program 46 proceeds to step S704 where the application designated in user interface 55 to be launched when digital storage media is connected is launched and executed. Once the application has been launched and executed, the process proceeds to step S705.

In step S705, system tray program 46 monitors whether one of the buttons on access device 10 has been depressed. As discussed earlier, HID 21 notifies system tray program 46 when one of the buttons has been depressed. If no buttons have been depressed, the process proceeds to step S708. If HID 21 notifies system tray program 46 that a button has been depressed, then the process proceeds to step S707. In step S707, system tray program 46 launches the application designated in user interface 55 for the specific button that had been depressed. Once the designated application has been launched and executed, the process proceeds to step S708.

In step S708, system tray program 46 determines whether the storage media has been disconnected from access device 10. This can be done by determining whether OS 42 has removed the drive designation assigned to the storage media when it was attached, since the drive designation is removed by OS 42 when the storage media is removed. If the storage media is still present, the process returns to step S705, where system tray program 46 monitors for the depression of one of the buttons of access device 10. If the storage media has been removed, the process returns to step S702, where system tray program 46 monitors for the connection of new storage media to access device 10.

Using the above process, access device 10 and system tray program 46 implement the present invention. Accordingly, a user can initiate specific applications, and functions to be executed by those applications, within PC 11 when digital storage media is connected to access device 10 and when specific buttons on access device 10 are depressed without having to directly interface with PC 11 during processing.

The present invention has been described with particular illustrative embodiments. It is to be understood that the invention is not limited to the embodiments described above. Various changes and modifications may be made to the invention by those of ordinary skill in the art without departing from the spirit and scope of the invention.

What is claimed is:

1. An access device for accessing data stored on removable digital storage media, the access device being connectable to a printing device and a computing device with multiple software modules, the access device comprising:

a media interface to a removable digital storage medium;

a first bi-directional interface to the computing device;

a second bi-directional interface to the printing device; and one or more buttons, wherein software in the computing device is configured to detect button depression and to launch one or more of the multiple software modules corresponding to a depressed button.

2. An access device according to claim 1, wherein each of the one or more buttons is assignable to one or more of the multiple software modules.

3. An access device according to claim 1, wherein the multiple software modules include one or more software modules with printing functionality.

4. An access device according to claim 3, wherein the software modules with printing functionality include a software module that provides a user interface for printing image data using the printing device, where the image data is stored on a removable digital storage medium accessible via said media interface.

5. An access device according to claim 1, wherein the multiple software modules include one or more software modules with media access functionality.

6. An access device according to claim 5, herein the software modules with media access functionality include a software module that downloads image data stored on a removable digital storage medium accessible via said media interface and stores the image data in the computing device.

7. An access device according to claim 2, wherein the computing device includes a button manager for managing assignments of one or more of the buttons to one or more of the multiple software modules.

8. An access device according to claim 1, wherein software in the computing device is configured to detect connection of a removable digital storage medium with said media interface and to launch one or more of the multiple software modules in response to detecting connection.

9. An access device according to claim 1, wherein said first bi-directional interface with the computing device has a bus architecture.

10. An access device according to claim 9, wherein said second bi-directional interface with the printing device shares the bus architecture of said first bi-directional interface.

11. An access device according to claim 9, further comprising a plurality of interfaces to downstream peripheral devices, each interface sharing the bus architecture of said first bi-directional interface.

12. An access device according to claim 10, wherein the access device is located within the printing device which is connected via said second bi-directional interface to the access device.

13. A method for accessing data stored on a removable digital storage medium using an access device being connectable to a printing device and a computing device with multiple software modules, the access device comprising a media interface to the removable digital storage medium, a first bi-directional interface to the computing device, a second bi-directional interface to the printing device, and one or more buttons, the method comprising the steps of:

detecting depression of one of the buttons; and launching one or more of the multiple software modules corresponding to a depressed button.

14. A method for accessing data stored on a removable digital storage medium according to claim 13, wherein each of the one or more buttons of the access device is assignable to one or more of the multiple software modules.

15. A method for accessing data stored on a removable digital storage medium according to claim 13, wherein the multiple software modules include one or more software modules with printing functionality.

16. A method for accessing data stored on a removable digital storage medium according to claim 15, wherein the software modules with printing functionality include a software module that provides a user interface for printing image data using the printing device, where the image data is stored on a removable digital storage medium accessible via the media interface.

17. A method for accessing data stored on a removable digital storage medium according to claim 13, wherein the multiple software modules include one or more software modules with media access functionality.

18. A method for accessing data stored on a removable digital storage medium according to claim 17, wherein the software modules with media access functionality include a software module that downloads image data stored on a removable digital storage medium accessible via the media interface and stores the image data in the computing device.

19. A method for accessing data stored on a removable digital storage medium according to claim 14, wherein the computing device includes a button manager for managing assignments of one or more of the buttons to one or more of the multiple software modules.

20. A method for accessing data stored on a removable digital storage medium according to claim 13, further comprising the steps of:

detecting connection of a removable digital storage medium with the media interface; and launching one or more of the multiple software modules in response to detecting connection.

21. A method for accessing data stored on a removable digital storage medium according to claim 13, wherein the first bi-directional interface with the computing device has a bus architecture.

22. A method for accessing data stored on a removable digital storage medium according to claim 21, wherein the second bi-directional interface with the printing device shares the bus architecture of the first bi-directional interface.

23. A method for accessing data stored on a removable digital storage medium according to claim 21, wherein the access device further comprises a plurality of interfaces to downstream peripheral devices, each interface sharing the bus architecture of the first bi-directional interface.

24. A method for accessing data stored on a removable digital storage medium according to claim 22, wherein the access device is located within the printing device connected via the second bi-directional interface to the access device.

25. Computer-executable process steps stored on a computer-readable medium, said computer-executable process steps for accessing data stored on a removable digital storage medium using an access device being connectable to a printing device and a computing device with multiple software modules, the access device comprising a media interface to the removable digital storage medium, a first bi-directional interface to the computing device, a second bi-directional interface to the printing device, and one or more buttons, said computer-executable process steps to perform a method according to any of claims 13 to 24.

26. A computer-readable medium which stores computer-executable process steps, the computer-executable process steps for accessing data stored on a removable digital storage medium using an access device being connectable to a printing device and a computing device with multiple software modules, the access device comprising a media interface to the removable digital storage medium, a first bi-directional interface to the computing device, a second bi-directional interface to the printing device, and one or more buttons, said computer-executable process steps comprising process steps executable to perform a method according to any of claims 13 to 24.

27. An access device for accessing data stored on removable digital storage media, the access device being connectable to a computing device with multiple software modules, the computing device being connectable to a printing device, the access device comprising:

a media interface to a removable digital storage medium;

a bi-directional interface to the computing device; and one or more buttons, wherein software in the computing device is configured to detect button depression and to launch one or more of the multiple software modules corresponding to a depressed button.

28. An access device according to claim 27, wherein each of the one or more buttons is assignable to one or more of the multiple software modules.

29. An access device according to claim 27, wherein the multiple software modules include one or more software modules with printing functionality.

30. An access device according to claim 29, wherein the software modules with printing functionality include a software module that provides a user interface for printing image data using the printing device, where the image data is stored on a removable digital storage medium accessible via said media interface.

31. An access device according to claim 27, wherein the multiple software modules include one or more software modules with media access functionality.

32. An access device according to claim 31, wherein the software modules with media access functionality include a software module that downloads image data stored on a removable digital storage medium accessible via said media interface and stores the image data in the computing device.

33. An access device according to claim 28, wherein the computing devices includes a button manager for managing assignments of one or more of the buttons to one or more of the multiple software modules.

34. An access device according to claim 27, wherein the software in the computing device is configured to detect connection of a removable digital storage medium with said media interface and to launch one or more of the multiple software modules in response to detecting connection.

35. An access device according to claim 27, wherein said bi-directional interface to the computing device has a bus architecture.

36. An access device according to claim 35, further comprising a plurality of interfaces to downstream peripheral devices, each interface sharing the bus architecture of said bi-directional interface.

37. A method for accessing data stored on a removable digital storage medium using an access device being connectable a computing device with multiple software modules, the computing device being connectable to a printing device, the access device comprising a media interface to the removal digital storage medium, a bi-directional interface to the computing device, and one or more buttons, the method comprising the steps of:

detecting depression of one of the buttons; and launching one or more of the multiple software modules corresponding to a depressed button.

38. A method for accessing data stored on a removable digital storage medium according to claim 37, wherein each of the one or more buttons of the access device is assignable to one or more of the multiple software modules.

39. A method for accessing data stored on a removable digital storage medium according to claim 37, wherein the multiple software modules include one or more software modules with printing functionality.

40. A method for accessing data stored on a removable digital storage medium according to claim 39, wherein the software modules with printing functionality include a software module that provides a user interface for printing image data using the printing device, where the image data is stored on a removable digital storage medium accessible via the media interface.

41. A method for accessing data stored on a removable digital storage medium according to claim 37, wherein the multiple software modules include one or more software modules with media access functionality.

42. A method for accessing data stored on a removable digital storage medium according to claim 41, wherein the software modules with media access functionality include a software module that downloads image data stored on a removable digital storage medium accessible via the media interface and stores the image data in the computing device.

43. A method for accessing data stored on a removable digital storage medium according to claim 38, wherein the computing device includes a button manager for managing assignments of one or more of the buttons to one or more of the multiple software modules.

44. A method for accessing data stored on a removable digital storage medium according to claim 37, further comprising the steps of:

detecting connection of a removable digital storage medium with the media interface; and launching one or more of the multiple software modules in response to detecting connection.

45. A method for accessing data stored on a removable digital storage medium according to claim 37, wherein the bi-directional interface with the computing device has a bus architecture.

46. A method for accessing data stored on a removable digital storage medium according to claim 45, wherein the access device further comprises a plurality of interfaces to downstream peripheral devices, each interface sharing the bus architecture of the bi-directional interface.

47. Computer-executable process steps stored on a computer-readable medium, said computer-executable process steps for accessing data stored on a removable digital storage medium using an access device being connectable to a computing device with multiple software modules, the computing device being connectable to a printing device, the access device comprising a media interface to the removable digital storage medium, a bi-directional interface to the computing device, and one or more buttons, said computer-executable process steps to perform a method according to any of claims 37 to 46.

48. A computer-readable medium which stores computer-executable process steps, the computer-executable process steps for accessing data stored on a removable digital storage medium using an access device being connectable to a computing device with multiple software modules, the computing device being connectable to a printing device, the access device comprising a media interface to the removable digital storage medium, a bi-directional interface to the computing device, and one or more buttons, said computer-executable process steps comprising process steps executable to perform a method according to any of claim 37 to 46.

* * * * *

UNITED STATES PATENT AND TRADEMARK OFFICE
CERTIFICATE OF CORRECTION

PATENT NO. : 6,691,187 B1
DATED : February 10, 2004
INVENTOR(S) : James A. Schwerin It is certified that error appears in the above-identified patent and that said Letters Patent is hereby corrected as shown below:

Column 1,
Line 55, "required" should read -- be required --.

Column 4,
Line 10, "types" should read -- types of --.

Column 9,
Line 29, "herein" should read -- wherein --.

Column 11,
Line 57, "nectable" should read -- nectable to --.

Column 12,
Line 65, "claim 37" should read -- claims 37 --.

Signed and Sealed this

Fourth Day of January, 2005

JON W. DUDAS
*Director of the United States Patent and Trademark Office*